United States Patent [19]

Mignani et al.

[11] Patent Number: 5,096,861
[45] Date of Patent: Mar. 17, 1992

[54] BORON/NITROGEN PRECERAMIC POLYMERS AND BORON NITRIDE CERAMIC MATERIALS PRODUCED THEREFROM

[75] Inventors: Gerard Mignani, Lyons; Jean-Jacques Lebrun, Caluire, both of France

[73] Assignee: Rhone-Poulenc Chimie, Courbevoie Cedex, France

[21] Appl. No.: 501,769

[22] Filed: Mar. 30, 1990

Related U.S. Application Data

[62] Division of Ser. No. 242,907, Sep. 12, 1988, Pat. No. 4,939,222.

[30] Foreign Application Priority Data

Sep. 11, 1987 [FR] France .................. 87 12587

[51] Int. Cl.$^5$ .................................................. C04B 35/58
[52] U.S. Cl. ........................................ 501/96; 525/50; 528/4; 528/5
[58] Field of Search .................. 528/5, 4; 525/50; 501/96

[56] References Cited

U.S. PATENT DOCUMENTS

| | | | |
|---|---|---|---|
| 4,581,468 | 4/1986 | Paciorek et al. | 501/96 |
| 4,767,728 | 8/1988 | Riccitiello et al. | 501/91 |
| 4,810,436 | 3/1989 | Johnson | 501/96 |
| 4,857,490 | 8/1989 | Johnson | 501/96 |

*Primary Examiner*—William R. Dixon, Jr.
*Assistant Examiner*—Anthony J. Green
*Attorney, Agent, or Firm*—Burns, Doane, Swecker & Mathis

[57] ABSTRACT

Crosslinked boron/nitrogen preceramic polymers are prepared by reacting (a) admixture of a trihalogenoborane A and a compound B containing at least one dihalogenated boron atom, with (b) an amino compound C containing at least one —NH$_2$ group; the resulting polymers are facilely pyrolyzed into boron nitride ceramic materials.

4 Claims, No Drawings

BORON/NITROGEN PRECERAMIC POLYMERS AND BORON NITRIDE CERAMIC MATERIALS PRODUCED THEREFROM

This application is a divisional of application Ser. No. 07/242,907 filed Sept. 12, 1988, U.S. Pat. No. 4,939,222.

CROSS-REFERENCE TO COMPANION APPLICATIONS

Our copending applications, Ser. No. 07/243,827 now U.S. Pat. No. 5,068,154 and Ser. No. 07/242,977, now abandoned both filed concurrently herewith and both assigned to the assignee hereof.

BACKGROUND OF THE INVENTION

1. Field of the Invention

The present invention relates to novel polymers based on boron and nitrogen and to a process for the preparation thereof.

This invention also relates to the use of such novel polymers in the production of ceramic materials and shaped articles based on boron nitride, especially boron nitride in fibrous form.

2. Description of the Prior Art

Boron nitride is increasingly in demand in this art in light of its high thermal stability, its resistance to thermal shock, its great chemical inertness and its very good thermal conductivity. On the other hand, its low electrical conductivity makes it an insulator of choice.

Several processes are presently known to the art for the preparation of boron nitride.

One such process includes reacting boron trichloride with ammonia in the gaseous state. A fine boron nitride powder is obtained in this manner, which may be sintered to produce solid shaped articles. However, the shaped articles thus produced exhibit a characteristic microporosity which may be highly detrimental for certain applications.

More recently, it was discovered that boron nitride could be produced by the pyrolysis of precursor polymers.

The advantage of this "polymer" method primarily resides in the form of the final product, and, more particularly, enables the production, after pyrolysis, of boron nitride fibers.

Thus, in U.S. Pat. No. 4,581,468 a preceramic organoboron polymer is described which is prepared by the interaction of ammonia (ammonolysis) with B-trichloro-N-tris(trialkylsilyl)borazine (a cyclic compound) and which, as indicated, after drawing and pyrolysis at 970° C., results in the production of boron nitride fibers.

However, the cyclic polymer described in this patent is very difficult to prepare and is thus expensive. Therefore, it is not suitable for production on an industrial scale.

On the other hand, the maximum yield by weight of boron nitride that can be produced from such type of starting material does not exceed 22%, indicating that actual yields are on average well below this value.

SUMMARY OF THE INVENTION

Accordingly, a major object of the present invention is the provision of a simple, efficient, economical and readily applicable improved process for the preparation of organometallic polymers based on boron and nitrogen in a wide variety of useful forms (wires, fibers, molded shaped articles, coatings, foils, films, and the like), and which various forms are facilely converted in high yields by weight, upon pyrolysis, into useful materials based on boron nitride.

Briefly, it has now surprisingly and unexpectedly been determined that boron nitride can be prepared, in high yields by weight, from precursor polymers based on boron and nitrogen, by reacting (a) a mixture containing a trihalogenoborane (compound A) and a boron compound which comprises at least one boron atom to which two halogen atoms are directly bonded (compound B), with (b) a compound containing at least one $NH_2$ group (compound C).

DETAILED DESCRIPTION OF THE PREFERRED EMBODIMENTS OF THE INVENTION

More particularly according to the present invention, in respect of the aforesaid compounds A and B a functionality f is assigned which is equal to the number of halogen atoms directly bonded to the boron atom. Thus, compound A, which is a trihalogenoborane, has a functionality of 3, while compound B has a functionality of 2.

The compounds C will hereinafter be designated aminolysis reagents generally (an amine compound having at least one $NH_2$ group), and an ammonolysis reagent in the more particular case where ammonia is used.

Also, and in consequence of the above, the reaction products produced from the compounds A, B and C shall hereinafter be designated, depending on the particular case, aminolysates or ammonolysates, with the latter of course being included in the generic class of "aminolysates".

These aminolysates, as more fully explained below, constitute the novel polymers based on boron and nitrogen, which circumscribe another object of the present invention.

The preparative process according to this invention essentially comprises a co-aminolysis of a mixture of at least one compound containing a difunctional boron atom and at least one compound containing a trifunctional boron atom.

Thus, it has surprisingly and unexpectedly now been discovered that such co-aminolysis enables the production of polymers having a structure constituting a particularly cross-linked network which imparts great thermal stability during pyrolysis, thereby increasing the yield in boron nitride.

The starting trifunctional compound A is advantageously trichloroborane, although other halogenoboranes are also suitable, such as, for example, a trifluoro-, a tribromo- or a triiodoborane.

The starting difunctional compound B is advantageously also a chlorine compound.

This compound preferably has the following general Formula (1):

wherein Y represents:

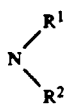

in which $R^1$ and $R^2$, which may be identical or different, are each a hydrogen atom, or a hydrocarbyl, organosilyl or hydrogenoorganosilyl radical.

The hydrocarbyl radicals are advantageously alkyl, cycloalkyl, aryl, alkylaryl or arylalkyl radicals, as well as alkenyl or alkynyl radicals.

Representative such alkyl radicals include the methyl, ethyl, propyl, butyl, pentyl, hexyl, heptyl and octyl radicals. Representative cycloalkyl radicals include the cyclopentyl, cyclohexyl and cycloheptyl radicals. Exemplary aryl radicals are the phenyl and naphthyl radicals, and exemplary alkylaryl radicals are the tolyl and xyxyl radicals. Representative arylalkyl radicals are the benzyl and phenylethyl radicals.

Illustrative of the alkenyl radicals are the vinyl, allyl, butenyl and pentenyl radicals, and illustrative alkynyl radicals are the ethynyl, propynyl and butylyl radicals.

In a preferred embodiment of the invention, the radicals $R^1$ and $R^2$ are organosilyl or hydrogenoorganosilyl radicals, and more particularly (triorgano)silyl or (hydrogenodiorgano)silyl radicals. Even more preferably, (trialkyl)silyl radicals are used, such as, in particular, trimethyl-, triethyl-, tripropyl-, tributyl-, tripentyl-, trihexyl-, triheptyl- or trioctylsilyl radicals. (Trimethyl)silyl radicals are especially preferred.

The compounds of Formula (1) are well known to this art and may be prepared by any method itself known to the art.

For example, in the case of alkyl type $R^1$ and $R^2$ radicals, see Wilberg and Schuster (*Zeitschrift fur Anorganische Chemie*, 213, page 77 (1933)), Brown (*Journal of the American Chemical Society*, 74, page 1219 (1952)), or Burg and Banus (*Journal of the American Chemical Society*, 76, page 3903 (1954)).

Concerning the radicals $R^1$ and $R^2$ of triorganosilyl type, see Jenne and Niedenzu (*Inorganic Chemistry*, 3, 68 (1964)), Sujishii and Witz (*Journal of the American Ceramic Society*, 79, page 2447 (1957)), or Wannagat (*Angew. Chemie, International Edition*, 3, page 633 (1964)).

In general, the difunctional compound B may be prepared by the action of $BCl_3$ on

under suitable conditions of temperature and molar ratio.

Finally, concerning the aminolysis reagents (compound C) according to the invention, ammonia, the primary amines, the diamines (hydrazine, alkylhydrazine, hydrazide, alkylenediamines, etc.), the amides, the silylamines, and the like, are exemplary.

However, preferably the compounds having the following general Formula (2) are used:

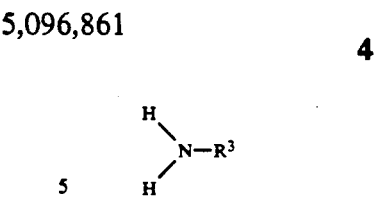

wherein the radical $R^3$ is a hydrogen atom, or a hydrocarbyl, organosilyl or hydrogenoorganosilyl radical. The following are particularly representative:

(i) ammonia ($R^3$=hydrogen atom);

(ii) the primary organoamines ($R^3$=alkyl, cycloalkyl, aryl, alkylaryl or arylalkyl), such as, for example, methylamine, ethylamine, propylamine, butylamine, pentylamine, heptylamine and octylamine, cyclopropylamine, phenylamine, and the like;

(iii) silylamines and more particularly triorganosilylamines, such as (trimethylsilyl)amine and (triethylsilyl)amine, or the hydrogenodiorganosilylamines, such as, for example, hydrogenodimethylsilyl)amine.

The preferred aminolysis reagents are the primary alkylamines and ammonia.

In a more preferred embodiment of the invention, ammonia is used.

The general reaction scheme of the aminolysis in the reaction medium is as follows:

$$>N-H+Cl-B<\rightarrow>N-B+HCl$$

The aminolysis reaction may be carried out in mass or, preferably, in an organic solvent medium (hexane, pentane, toluene, etc.), under anhydrous conditions.

The operation is typically carried out under atmospheric pressure, although lower or higher pressures are also within the ambit of this invention.

On the other hand, the aminolysis reactions are characteristically rather exothermic and it is thus preferred to operate at a low temperature.

The duration of the reaction, as a function of the amounts of the reagents introduced, may range from a few minutes to several hours.

The molar ratio in the initial mixture between the trifunctional compound (form T) and the difunctional compound (form D) may vary to a very large degree. In general, it is observed that the higher the percentage of the trifunctional compound in the mixture, the higher will be the pyrolytic yield in boron nitride of the polymer produced upon completion of the reaction. In a preferred embodiment of the invention, the molar ratio T/D in the initial mixture is at least 1.

At the end of this reaction stage, the polymer is separated from the reaction medium, in particular the ammonium chlorhydrate formed, by any known means, for example by filtration or extraction and decantation by means, in particular, of an ammonia solution.

The polymer recovered in this manner, optionally after the elimination of the solvent and drying, constitutes the production.

In addition to the aforedescribed preparative process, the invention also features novel polymers based on boron and nitrogen produced thereby, and which, after pyrolysis thereof, result in the production of high yields by weight of boron nitride.

Thus, it has now also unexpectedly been determined that high weight yields of boron nitride can be produced from a polymer precursor based on boron and nitrogen, said precursor polymer comprising, per molecule:

(a) at least one structural unit of the Formula (I):

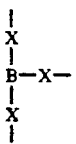

(I)

and (b) at least one structural unit of the Formula (II):

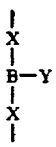

(II)

wherein Y represents $N-R^1R^2$ and X represents $N-R^3$, in which $R^1$, $R^2$ and $R^3$, which may be identical or different, are each a hydrogen atom, or a hydrocarbyl, organosilyl or hydrogenoorganosilyl radical.

It has now been discovered that such polymers based on boron and nitrogen, which have a network structure essentially comprising a combination of units of Formula (I) and units of Formula (II) such as defined above, have a significantly improved resistance to pyrolysis relative to the known precursors. Consequently, it is thus possible to produce ceramic materials based on boron nitride in good yields by weight.

It will be appreciated that the polymers comprising all of the desired (I) and (II) units, i.e., all of the desired $R^1$, $R^2$ and $R^3$ radicals, can be prepared simply by reacting the compounds B and C defined above, which contain the same $R^1$, $R^2$ and $R^3$ radicals.

By extrapolating, relative to the novel polymers of the present invention, the aforesaid concept of functionality as regards the compounds A and B, the structural units of Formula (I) may formally be considered as being trifunctional, as they result from the aninolysis of a trifunctional boron compound starting material (compound A), and the structural units of Formula (II) as being difunctional, as they result from the aminolysis of a difunctional boron compound starting material (compound B).

Similarly, the ratio between the units of Formula (I) and those of Formula (II) in the final polymer may be adjusted in a simple manner by utilizing an appropriate ratio between the compounds A and compounds B initially present in the reaction medium.

In a preferred embodiment of the invention, the polymer contains at least 50 molar % of units of formula (I).

In general, it is observed that the higher the percentage of units (I), the higher the yield in boron nitride after pyrolysis.

As regards the hydrocarbyl and organosilyl radicals suitable for the polymers according to the invention, refer to the different examples given above of the radicals $R^1$, $R^2$ and $R^3$ of compounds B and C.

Thus, alkyl, cycloalkyl, aryl, alkylaryl and arylalkyl radicals, and (triorgano)silyl radicals, such as, for example, the (trialkyl)silyl radicals, are especially suitable.

In another preferred embodiment of the invention, the $R^3$ radical is selected from among a hydrogen atom and the alkyl radicals.

Even more preferably, the $R^3$ radical is a hydrogen atom.

On the other hand, in order to obtain the best yields in ceramics in the pyrolysis, it is preferably to select the $R^1$ and $R^2$ radicals from among the organosilyl radicals, and, more particularly, from among the (trialkyl)silyl radicals.

In a particularly preferred example of a polymer according to the invention, the units (I) and (II) are of the following type:

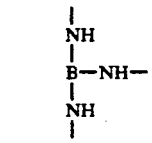

(I)

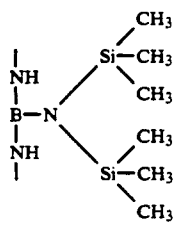

(II)

The polymers according to the invention have a number average molecular weight ranging from 300 to 50,000 preferably from 500 to 5,000.

They also have a weight average molecular weight of from 600 to 100,000, preferably from 1,000 to 10,000.

Depending on the molar ratio existing between the units of Formula (I) and those of Formula (II), the polymers according to the invention may be present, at ambient temperature, in a form varying from a rather viscous or highly viscous oil to the solid state. In general, a high proportion of units of Formula (I) corresponds to a high molecular weight polymer and thus to a high viscosity.

The polymers according to the invention are soluble in most of the usual organic solvents (hexane, toluene, and the like), which may be quite advantageous for the shaping thereof.

The polymers based on boron and nitrogen according to the invention are especially useful in the manufacture of ceramic materials and shaped articles at least in part comprising boron nitride.

In the most general case (the production of ceramic powders), the polymer is pyrolyzed in an inert atmosphere, under vacuum, or preferably in ammonia, at a temperature of from 100° to 2,000° C., until the polymer is entirely converted into boron nitride.

The polymer may be formed prior to pyrolysis, by molding or drawing, for example. If it is desired to produce fibers, the polymer is drawn by means of a conventional drawing die (possibly after melting, if the polymer is initially in the solid state), then heat treated at a temperature of from 100° to 2,000° C. and preferably under an ammonia atmosphere, to yield boron nitride fibers.

The resulting fibers may then be used, e.g., as reinforcing materials for composites of he ceramic/ceramic or ceramic/metal type.

In order to further illustrate the present invention and the advantages thereof, the following specific examples are given, it being understood that same are intended only as illustrative and in nowise limitative.

EXAMPLE 1

This example illustrates the ammonolysis of a difunctional boron compound, and therefore is outside of the scope of the present invention.

The compound used had the following structural formula:

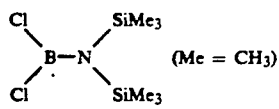
(Me = CH₃)

Into a 500 ml three-necked flask equipped with mechanical agitation means, a gas inlet tube and a solid CO₂ condenser, the following materials were introduced under a dry nitrogen blanket:

(i) 6.85 g (0.0283M) of

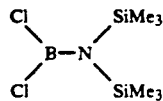

(ii) 270 ml hexane (distilled over LiAlH₄).

The mixture was cooled to −40° C. and gaseous NH₃ was then introduced; the reaction was exothermic. During the introduction of the gaseous NH₃, the temperature was maintained at −28° C. The flow rate of the gaseous NH₃ was maintained at about 10 l/h of the gas; 12.5 l of gaseous NH₃ (0.558 mole) were introduced.

Ammonium chlorhydrate was formed during the experiment, which thickened the solution. Upon completion of the experiment, the NH₄Cl formed was filtered on sintered glass. The precipitate was washed several times with hexane (distilled over LiAlH₄). 2.9 g ammonium chlorhydrate were recovered (3.05 g theoretical). The solution recovered was clear.

The solvents were evaporated under a pressure of 20 mm Hg; 4.8 g of a low viscosity, colorless oil were recovered.

The yield of the ammonolysis reaction was 91.3%
$\overline{Mn}=300$
$IP=1$
$\overline{Mw}=300$
$\overline{Mz}=400$ The polymer was then pyrolyzed under argon. The TGA yield at 800° C. was then 6.0%.

EXAMPLES 2 to 8

In accordance with the process of the invention, a co-ammonolysis was carried out between BCl₃ and the difunctional compound used in the comparative Example 1.

The procedure was identical to that of said comparative Example 1.

For these experiments, the molar ratio of:

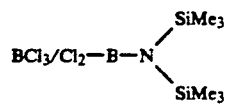

(T/D) was varied in the respective starting mixtures.

The results are reported in the Table which follows, including the following:

(1) the total concentration of the species T and D in the initial solvent (conc.);

(2) the reaction temperature (T° C.);

(3) the yield of the co-ammonolysis reaction (yield %);

(4) the number and weight average molecular weights of the polymers obtained ($\overline{Mn}$ and $\overline{Mw}$, respectively);

(5) the polydispersity index IP;

(6) the TGA yield at 800° C.

For each of Experiments 2 to 8, analysis evidenced that the resulting polymers essentially consisted of a combination of structural units of the formula:

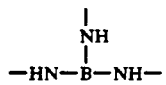

and structural units of the formula:

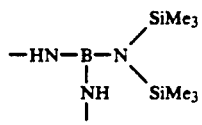

This example illustrates a co-ammonolysis according to the invention, between BCl₃ and

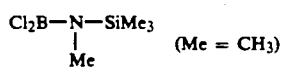
(Me = CH₃)

Into a 2 liter reactor under nitrogen, the following materials were introduced: 920 ml dry hexane, 47.0 g (0.401 mole) BCl₃ and 115.8 g (0.630 mole) of

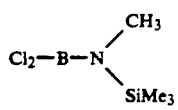

with the reactor previously being cooled to −37° C.

The ammonia was then introduced: 255 liters (11.38 moles).

The duration of the introduction of NH₃ was 5 h. After filtering, rinsing with hexane and the evaporation of the solvent, 29.1 g of a highly viscous oil were recovered. The isolated yield was 31%.

TGA (850° C.): 31%
$\overline{Mn}$: 460
$\overline{Mw}$: 640
IP: 1.38

Analysis evidenced that the polymer obtained essentially consisted of a combination of structural units of the formula:

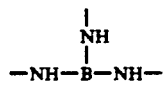

and structural units of the formula:

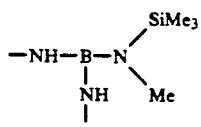

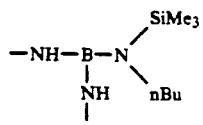

EXAMPLE 10

This example illustrates a co-ammonolysis according to the invention, between $BCl_3$ and

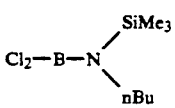

(Me = $CH_3$; nBu = n-butyl)

Into a 2 liter reactor, under nitrogen, the following materials were introduced: 1.58 l dry hexane, 78.6 g (0.67 mole) $BCl_3$ and 145.1 g (0.64 mole) of

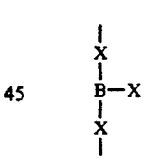

with the reactor previously being cooled to 035° C.

The ammonia was then introduced: 310 liter (13.84 moles) $NH_3$.

The duration of the introduction of $NH_3$ was 6 h. After filtering, rinsing with hexane and the evaporation of the solvent, 90.2 g of a viscous and clear oil were recovered. The isolated yield was 68.5%.

TGA (850° C.): 28.64%
$\overline{Mn}$: 620
$\overline{Mw}$: 1,100
IP: 1.77

Analysis evidenced that the resulting polymer essentially consisted of a combination of structural units of the formula:

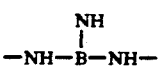

and structural units of the formula:

These results clearly show the advantage of the process according to the invention in producing polymers based on boron and nitrogen having high molecular weights and improved high temperature stability. Consequently, appreciably improved yields in boron nitride were obtained after pyrolysis.

TABLE

| Example | Ratio $BCl_3/Cl_2B-N(SiMe_3)_2$ | Conc. g/l | T° C. | Yield % | $\overline{Mn}$ | $\overline{Mw}$* | IP | TGA % 800° C. |
|---|---|---|---|---|---|---|---|---|
| 2 | 23/77 | 84 | −28 | 87.9 | 600 | 700 | 1.2 | 12 |
| 3 | 48/52 | 207 | −35 | 66.8 | 700 | 900 | 1.3 | 18 |
| 4 | 53/47 | 70 | −15 | 71.6 | 800 | 1300 | 1.6 | 22 |
| 5 | 63.5/36.5 | 78 | −24 | 65.3 | 800 | 1200 | 1.5 | 17 |
| 6 | 65/35 | 90 | −25 | 72.2 | 700 | 1100 | 1.5 | 24 |
| 7 | 75/25 | 89 | −33 | 42.0 | 600 | 700 | 1.3 | 20 |
| 8 | 76/24 | 81 | −22 | 33.8 | 900 | 1700 | 1.9 | 29 |

*GPC Analysis: columns Shodex 3 (A 80 M) (l = 1.5 m) + one column at 802; anhydrous $CH_2Cl_2$ solvent (no alocohol)

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the production of a boron nitride ceramic material, comprising pyrolyzing a boron/nitrogen polymer comprising (a) at least one recurring structural unit of the formula (I):

$$\begin{array}{c} | \\ X \\ | \\ B-X \\ | \\ X \\ | \end{array} \quad (I)$$

and (b) at least one recurring structural unit of the formula (II):

$$\begin{array}{c} | \\ X \\ | \\ B-Y \\ | \\ X \\ | \end{array} \quad (II)$$

in which Y is $N-R^1R^2$ and X is $N-R^3$, wherein $R^1$, $R^2$ and $R^3$, which are identical or different, are each a hydrogen atom, or a hydrocarbyl, organosilyl or hydrogenoorganosilyl radical.

2. The process as defined by claim 1, carried out in an ammonia atmosphere.

3. The process as defined by claim 1, wherein said boron/nitrogen polymer is a shaped article.

4. The process as defined by claim 3, wherein said boron/nitrogen polymer is in fibrous form.

* * * * *